United States Patent [19]
Koga

[11] 4,454,173
[45] Jun. 12, 1984

[54] METHOD FOR LINING PIPES IN A PIPELINE

[75] Inventor: Motoyuki Koga, Tokyo, Japan

[73] Assignee: Hakko Co., Ltd., Tokyo, Japan

[21] Appl. No.: 490,108

[22] Filed: Apr. 29, 1983

[30] Foreign Application Priority Data

| Apr. 30, 1982 | [JP] | Japan | 57-74322 |
| Apr. 30, 1982 | [JP] | Japan | 57-74323 |
| Apr. 30, 1982 | [JP] | Japan | 57-74324 |
| Apr. 30, 1982 | [JP] | Japan | 57-74325 |

[51] Int. Cl.³ .................................................. B05D 7/22
[52] U.S. Cl. .................................. 427/235; 427/181; 427/237; 427/238
[58] Field of Search .................. 427/181, 235, 237, 238

[56] References Cited
U.S. PATENT DOCUMENTS
4,327,132  4/1982  Shinno .............................. 427/235

*Primary Examiner*—James R. Hoffman
*Attorney, Agent, or Firm*—Martin A. Farber

[57] ABSTRACT

A method for lining pipes in a pipeline. The method is characterized in that the air in the pipeline is sucked from an outlet by a vacuum pump together with plastics mist, and additional air is supplied from an inlet of the pipeline at a low pressure, so that the pipeline is lined with the plastics. The residual plastics mist is recovered into a tank at the outlet end of the pipeline.

7 Claims, 10 Drawing Figures

FIG. 5 density of mist (g/m³)

distance of carried mist (m)

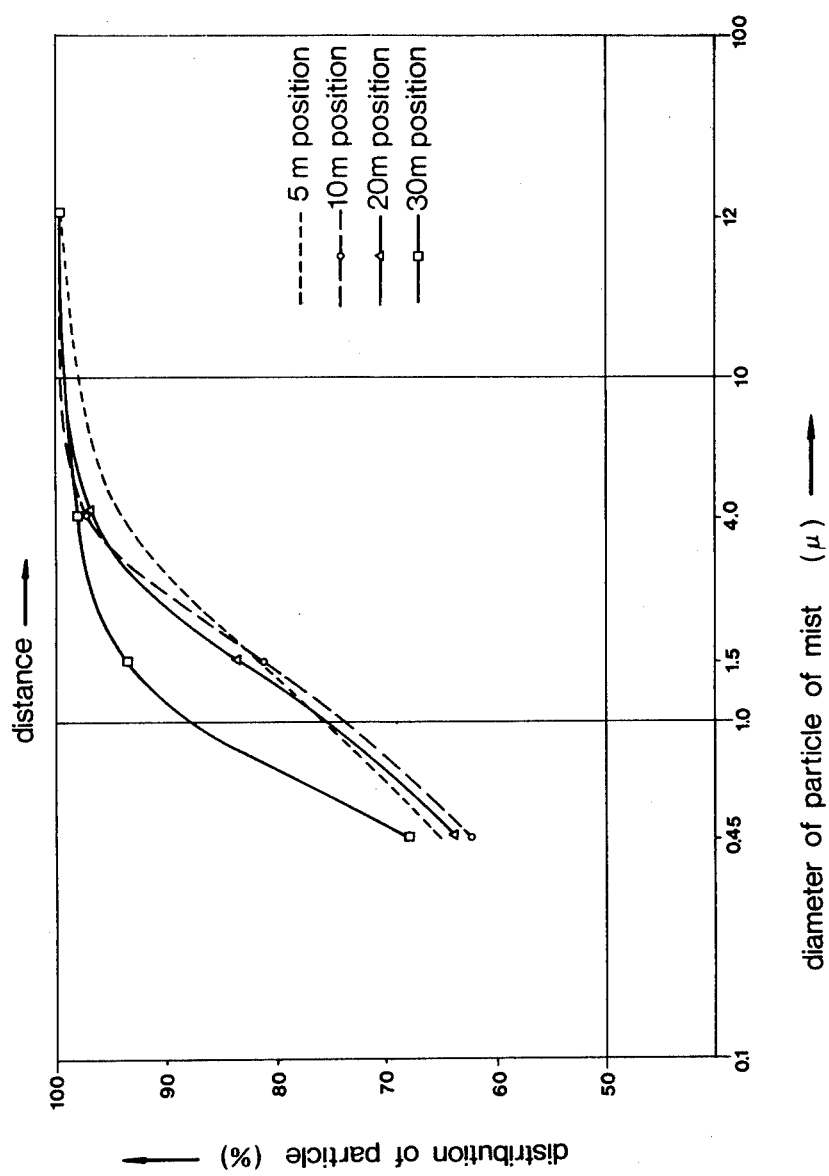

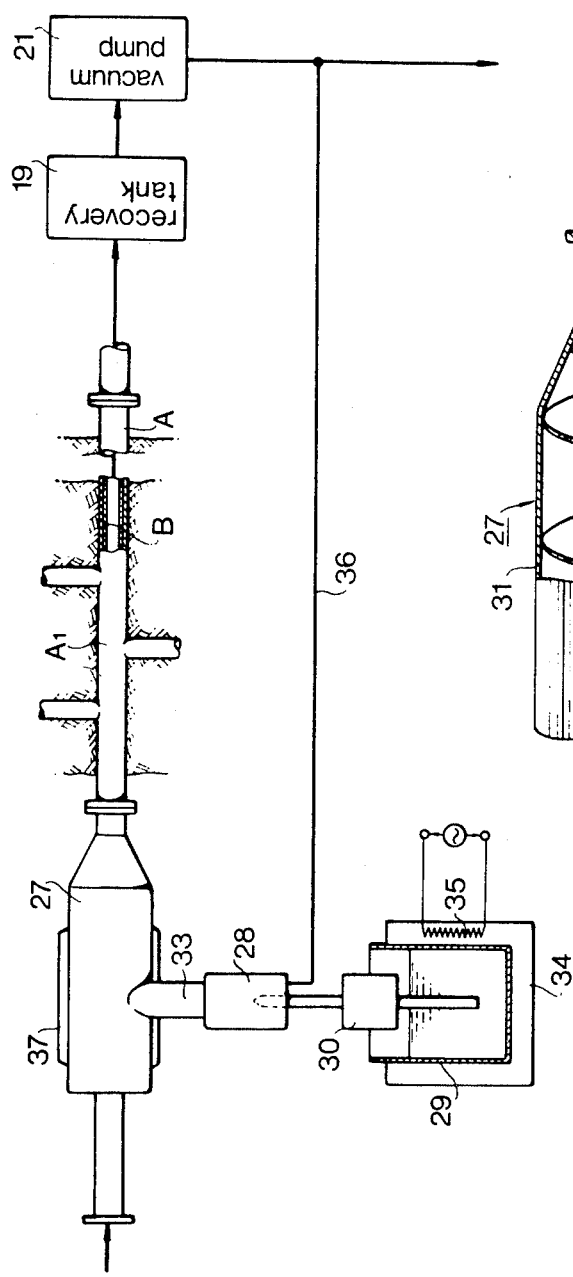

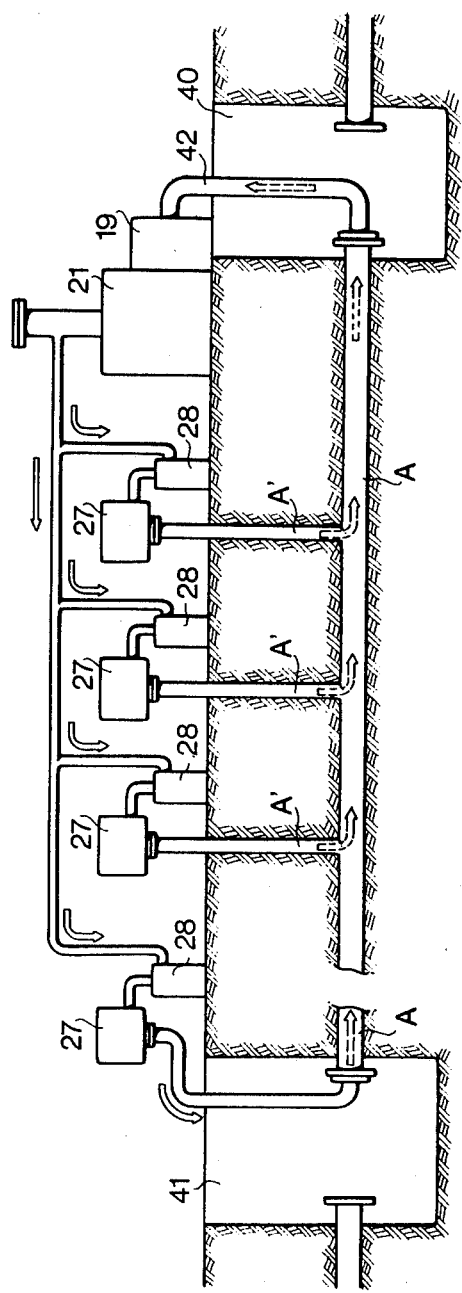

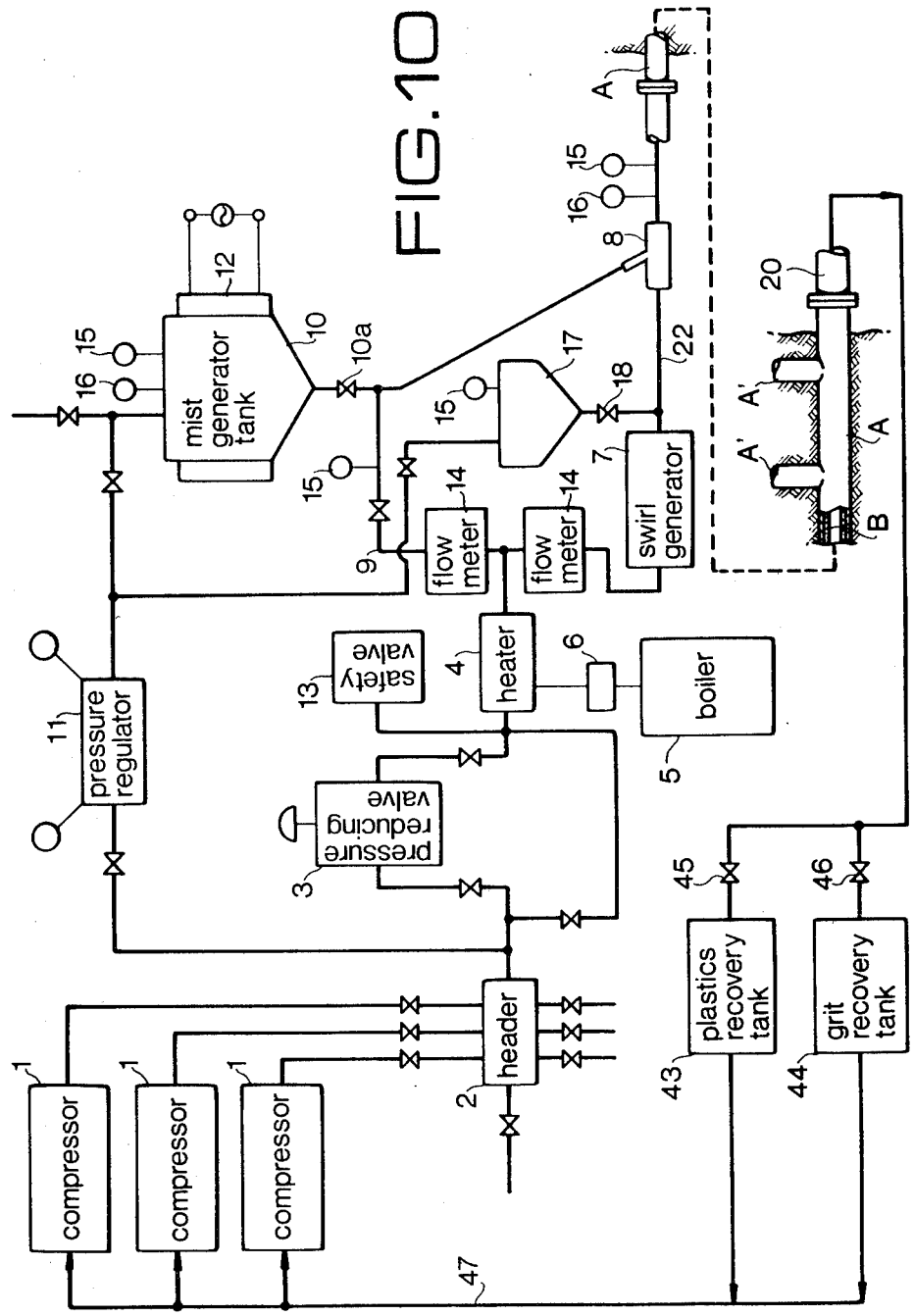

METHOD FOR LINING PIPES IN A PIPELINE

BACKGROUND OF THE INVENTION

The present invention relates to a method for lining pipes in a pipeline such as town gas pipeline or water pipeline, and more particularly to a method for lining pipes with plastics in order to repair old pipes.

A conventional lining method for old pipes is that fine droplets of thermosetting plastics such as epoxy resin are carried through the pipes by airstream produced by a compressor or blower, so that the inner walls of the pipes may be coated with the plastics. In the conventional method, the velocity and pressure of carrier air are comparatively high, for example the velocity is 80 m/sec.-100 m/sec. and the pressure is 2 Kg/cm$^2$-7 Kg/cm$^2$. Under conditions of high velocity and pressure of carrier air plastics having a low viscosity is liable to move on the inner wall of pipe without sticking to the inner wall. Accordingly, viscosity of the plastics for the lining should be held to a high value. However, plastics having a high viscosity is hard to be pulverized and to spread on the inner wall. Therefore, such a plastics does not uniformly adhere to the inner wall.

On the other hand, the majority of old pipes are pierced with a plurality of holes caused by corrosion. Accordingly, plastics supplied at a high pressure flows out through the holes, so that the holes are not blocked with the plastics.

In addition, it may happen that the holes are expanded or the pipes are broken by the plastics.

SUMMARY OF THE INVENTION

The object of the present invention is to provide a method by which pipes may be uniformly lined with plastics with the blocking of holes.

According to the present invention, a method for lining pipes in a pipeline comprises connecting an end opening of the pipeline to a vacuum generator; supplying plastics mist to the other end opening of the pipeline; sucking the air in the pipeline by the vacuum generator together with the plastics mist; and recovering the residual plastics mist at the outlet end of the pipeline.

BRIEF DESCRIPTION OF THE DRAWINGS

FIG. 5 shows the relationship between the density of plastics mist and the distance of carried mist;

FIG. 6 shows relationship between the diameter of particle of mist and distribution of the particle and the distance;

FIG. 7 shows another embodiment of the present invention;

FIG. 8 shows a swirl generator used in the system of FIG. 7;

FIGS. 9 and 10 are schematic diagrams showing other embodiments of the present invention, respectively.

DETAILED DESCRIPTION OF THE PREFERRED EMBODIMENTS

Figure 1:
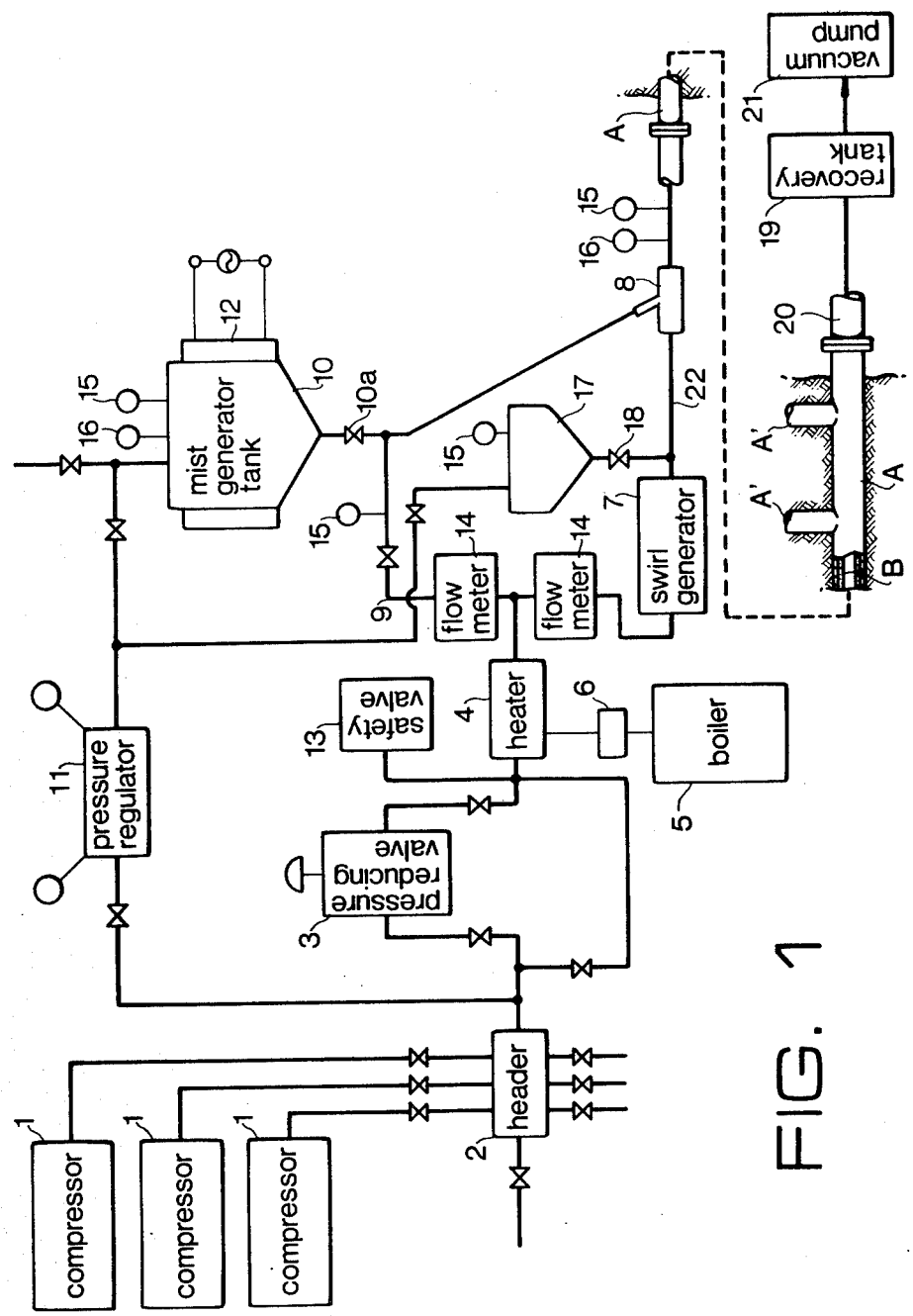
FIG. 1 is a schematic diagram showing a system for using a method according to the present invention.

Referring to FIG. 1, the system for a method according to the present invention is provided with compressors 1 for supplying a carrier air or gas at a low pressure and a vacuum pump 21 for sucking the air in pipes in a pipeline A. Outlets of compressors 1 are connected to a header 2 which is in turn communicated with a heater 4 through a pressure reducing valve 3. The heater 4 comprises a heat exchanger and is supplied with steam from a boiler 5 through a pressure reducing valve 6 so as to heat the air passing therethrough. Thus, the heater 4 supplies hot carrier air at a low pressure, for example 0.3 Kg/cm$^2$. The carrier air is fed to a confluent head 8 through a volumetric flow meter 14, swirl generator 7 and pipe 22.

On the other hand, a part of compressed air from the header 2 is fed to a mist generator tank 10 through a pressure regulator 11. In the tank 10, melted thermosetting plastics such as epoxy resin is stored and heated by an electric heater 12 to keep viscosity of the plastics in a low value. A part of hot carrier air from the heater 4 passes through a pipe 9 and volumetric flow meter 14 to the confluent head 8. The melted plastics in the tank 10 is injected into the pipe 9 by the compressed air from the header 2, so that the melted plastics is pulverized in the pipe 9 and carried to the head 8.

The system is further provided with an abrasive grain or grit tank 17 which is communicated with an outlet of the pressure regulator 11 and with the pipe 22 through a valve 18. Grits in the tank 17 are used for grit-blasting inner walls of pipes in the pipeline A. The system is further provided with a safety valve 13, pressure meters 15, thermometers 16 and a recovery tank 19 communicated with an end of an end pipe of the pipeline A and with the vacuum pump 21. The other end of the pipeline A is connected to the head 8.

In operation, air fed by compressors 1 at a low pressure acts to inject melted plastics in the tank 10 into the pipe 9 to form mist of the plastics. The mist of the plastics is fed to the head 8 and carried to the pipeline A by the hot carrier air supplied from the heater 4. On the other hand, the vacuum pump 21 draws air in the pipes to provide a low vacuum pressure, for example, about −0.3 Kg/cm$^2$. Thus, the mist of plastics is carried a long distance of the pipeline by the carrier air. Since the mist is drawn by the vacuum pump 21, the mist through pipes to be treated does not flow into branches A' and does not flow out through holes formed by corrosion of the pipes. Further, carrier air supplied by compressors 1 at low pressure does not cause the mist inducted by the vacuum pump 21 to deflect from the pipeline. Thus, a uniform liner B can be formed on inner walls of the pipes.

In case of very old pipes, it is preferable to remove dirt, rust and others from inner walls of the pipes. To this end, before the lining by plastics, grits in the tank 17 are injected into the pipes by carrier air at a high pressure in order to perform grit-blasting.

It will be noted that it is preferable to pre-heat the pipeline before the treatment. The heating can be carried out by blowing hot air into the pipeline from a heat source such as a furnace or heat radiated from the compressors 1.

Figure 2:
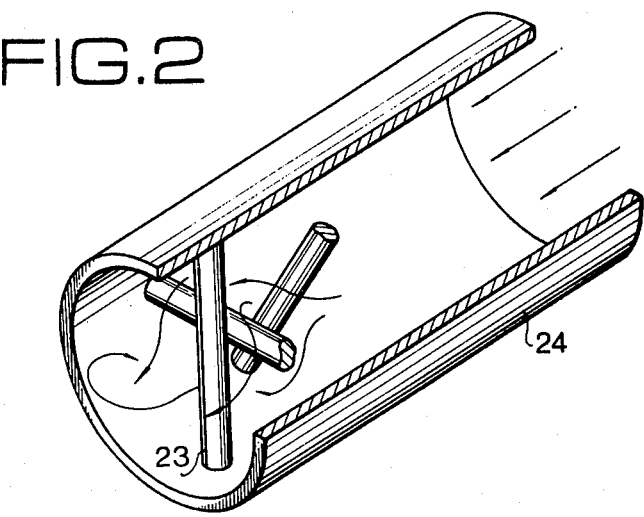
FIGS. 2 and 3 are perspective views showing swirl generators, respectively.
Figure 3:
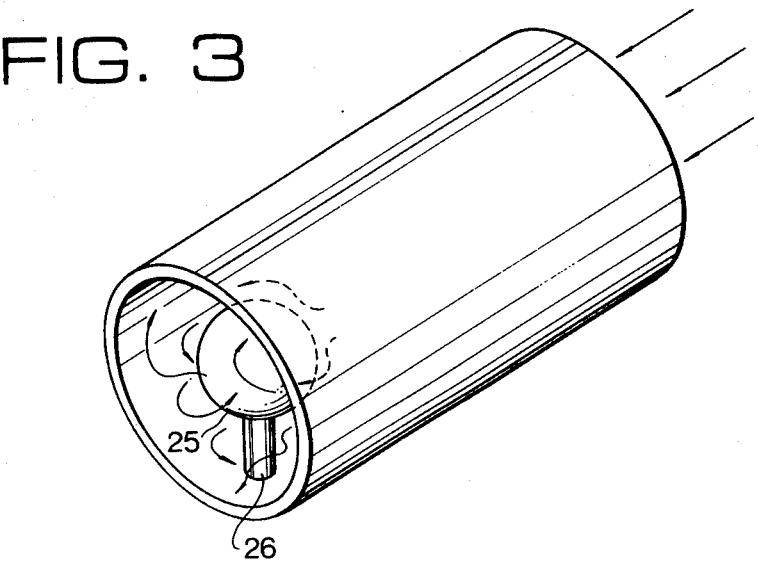

FIGS. 2 and 3 show examples of the swirl generator 7. In the swirl generator of FIG. 2, a plurality of bars 23 are radially disposed at random in a cylinder 24 so as to generate swirls. The device of FIG. 3 comprises a spherical block 25 supported by a rod 26. The block and rod act as swirl generating members. By the swirl generator 7, the carrier air swirls in the pipeline A, so that effective grit-blasting and uniform lining are carried out.

Figure 4:
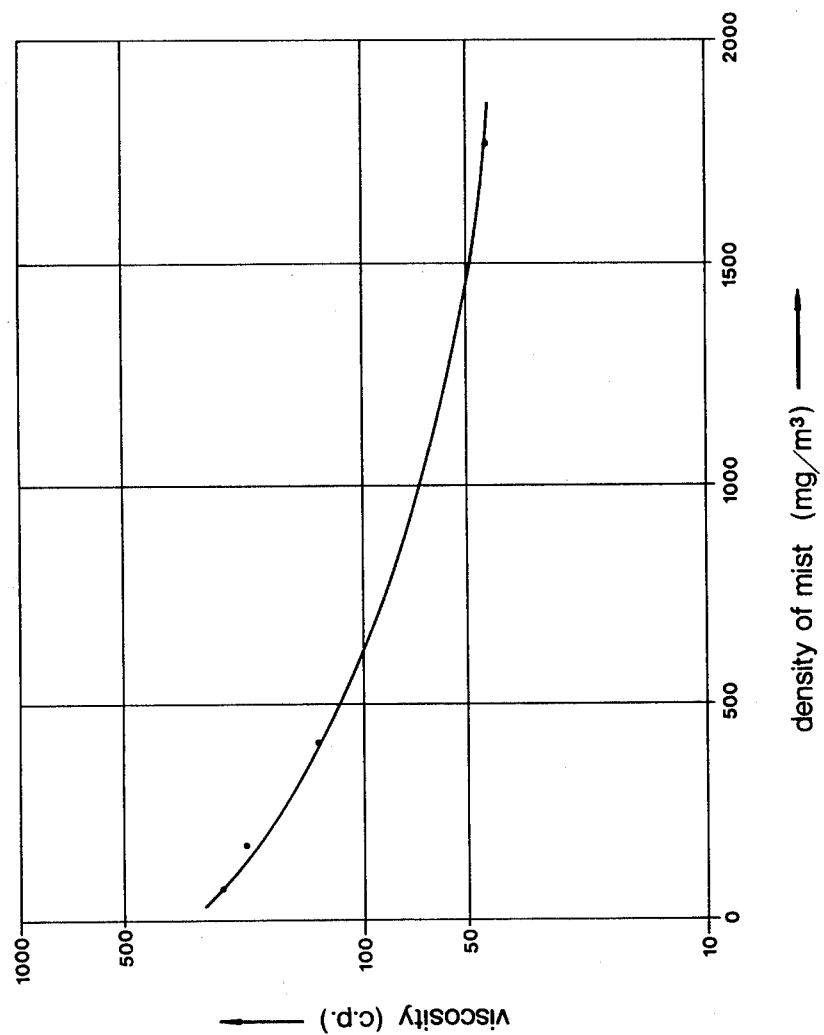
FIG. 4 shows the relationship between the viscosity of a plastics and the density of the mist thereof.

FIG. 4 shows the relationship between the viscosity of a plastics and the density of mist of the plastics. It will be seen that if the viscosity of the plastics is lowered, the density of the mist can be increased. Since the viscosity of plastics used in the system according to the present invention can be lowered, the pipes to be treated are uniformly and sufficiently lined with plastics.

Figure 5:
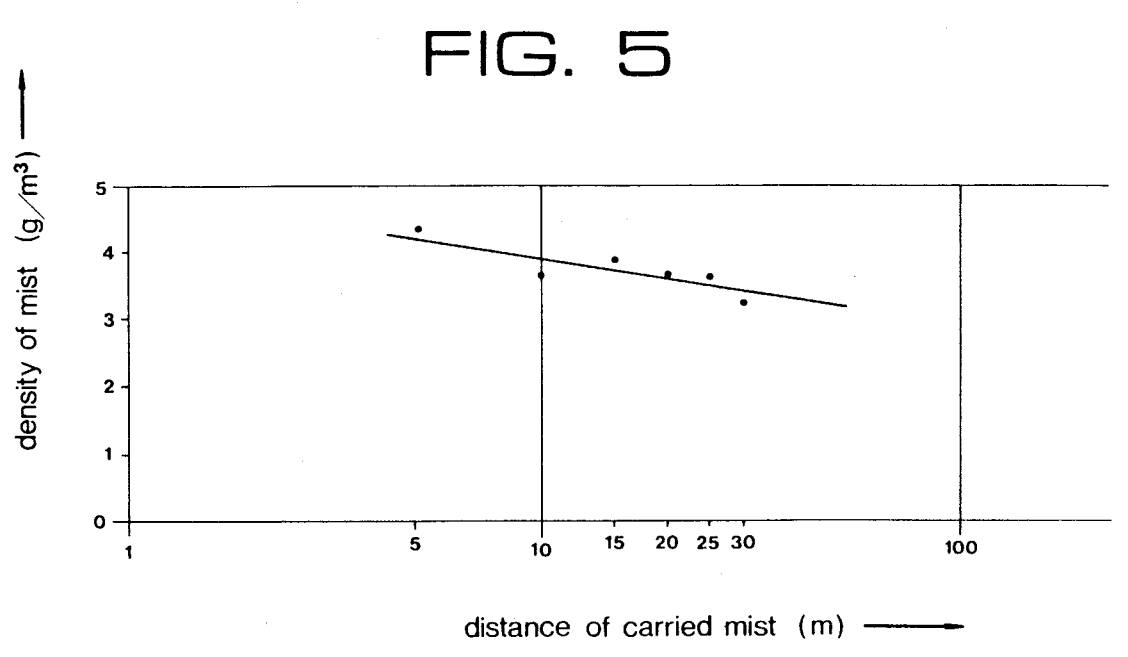

FIG. 5 shows the relationship between the density of mist and the distance of carried mist and FIG. 6 shows the relationship between the diameter of particle of mist and the distribution of the particle and the distance. In accordance with the present invention, plastics can be pulverized to fine particles because of low viscosity of melted plastics. Thus, it will be understood that the particles can be carried a long distance, which means that a long pipeline can be uniformly lined with plastics.

FIG. 7 shows another embodiment of the present invention. The system is not provided with a compressor for supplying compressed air to the pipeline. Mist of plastics is inducted into pipes of the pipeline A by the vacuum pump 21. The system comprises a swirl generator 27, a mist generator 28, a tank 29 and a pump 30. The swirl generator 27 is connected to an inlet of an end pipe $A_1$ of the pipeline. As shown in FIG. 8, the swirl generator 27 comprises a cylinder 31, a spiral guide plate 32 secured to the inner wall of the cylinder 31, and a heater 37. The mist generator 28 is connected to the swirl generator 27 by a nozzle 33. The tank 29 is heated by a thermostat 34 having a heater 35 to melt plastics and to keep it in low viscosity. The mist generator 28 operates to pulverize the melted plastics supplied by the pump 30 with the aid of air supplied from a discharge port of the vacuum pump 21 passing through a pipe 36.

The vacuum pump 21 operates to generate high or low vacuum pressure at the inlet thereof, for example $-2$ Kg/cm² to $-7$ Kg/cm² as high vacuum pressure or $-0.3$ Kg/cm² as low vacuum pressure. Thus, air is inducted into the pipes through the swirl generator 27, so that the mist is carried by the carrier air which is turned by the swirl generator.

FIG. 9 shows another embodiment of the present invention. As shown in the figure, there is provided a plurality of pits 40, 41 at a suitable distance for the pipeline A. One end of the pipeline is connected to the inlet of the recovery tank 19 through a hose 42. The outlet of the vacuum pump 21 is connected to a plurality of mist generators 28 which are disposed at the other end of the pipeline A and at every branches A'. The end swirl generator 27 is connected to the end of the pipeline A and other middle swirl generators 28 are connected to respective branches A'. Thus, mist of plastics is drawn into the pipeline A and branches A', so that the pipes are lined with the plastics.

Referring to FIG. 10 showing another embodiment of the present invention, the system is not provided with a vacuum pump, and compressors 1 act also as vacuum pumps. In the system, a plastics recovering tank 43 and grit recovering tank 44 are connected to the outlet end of the pipeline through valves 45 and 46 respectively. Outlets of both tanks are connected to inlets of the compressors 1 by a pipe 47. At the grit-blasting, the valve 45 is closed and valve 46 is opened. When lining the pipes, valve 45 is opened and valve 46 is closed and mist of plastics is carried by the carrier air stream generated by compressors 1. Other functions are the same as those of the system of FIG. 1.

While the presently preferred embodiment of the present invention has been shown and described, it is to be understood that this disclosure is for the purpose of illustration and that various changes and modifications may be made without departing from the spirit and scope of the invention as set forth in the appended claim.

What is claimed is:

1. A method for lining pipes in a pipeline comprising:
   connecting an end opening of the pipeline to a vacuum generator;
   supplying plastics mist to the other end opening of the pipeline;
   sucking the air in the pipeline by said vacuum generator together with the plastics mist; and
   recovering the residual plastics mist at the outlet end of the pipeline.

2. The method according to claim 1 further comprising supplying air into the pipeline from the inlet at a low pressure.

3. The method according to claim 1 further comprising connecting the discharge port of said vacuum generator to a plastics mist supplying means so as to operate it to produce plastics mist.

4. The method according to claim 1 further comprising connecting the discharge port of said vacuum generator to the inlet of the pipeline to supply air into the pipeline.

5. The method according to claim 1 further comprising performing a grit-blasting against the inner wall of the pipeline before the lining of the pipeline.

6. The method according to claim 1 further comprising causing the air stream in the pipeline to swirl.

7. The method according to claim 1 wherein said plastics mist is supplied from an end of at least one branch pipe of the pipeline.

* * * * *